Sept. 6, 1927.  
M. SKOLNIK  
WOODWORKING APPARATUS  
Filed April 1, 1926  
1,641,646  
7 Sheets-Sheet 1
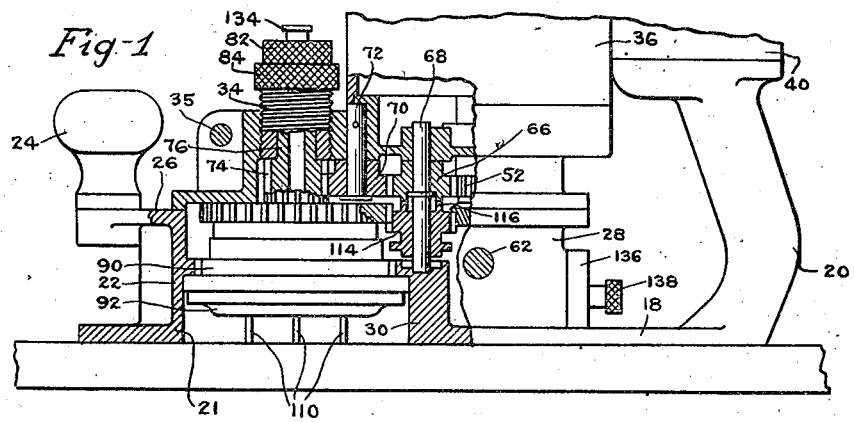
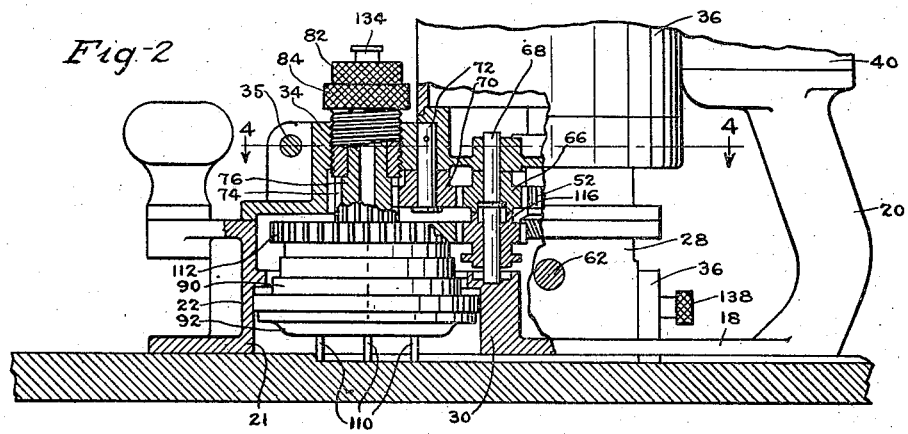
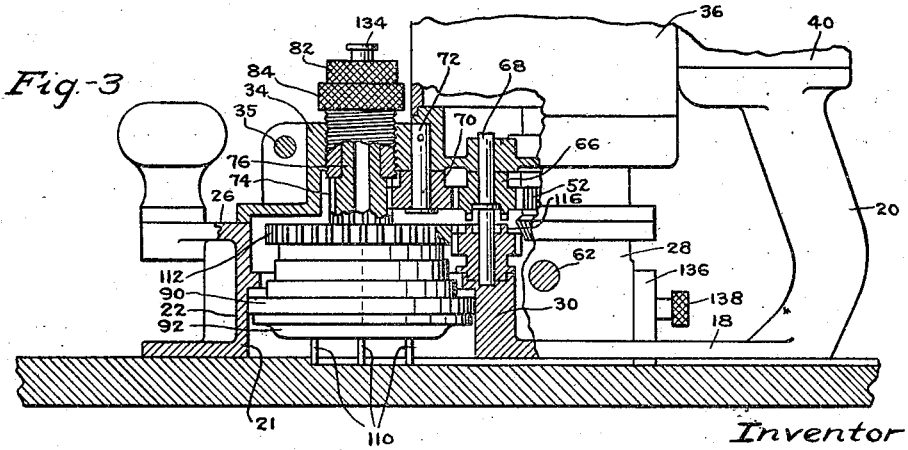
Inventor:  
Max Skolnik.  
By Whiteley and Ruckman  
Attorneys.

Sept. 6, 1927. 1,641,646

M. SKOLNIK

WOODWORKING APPARATUS

Filed April 1, 1926 7 Sheets-Sheet 2

Inventor:
Max Skolnik.
By Whiteley and Ruckman
Attorneys.

Sept. 6, 1927.    M. SKOLNIK    1,641,646
WOODWORKING APPARATUS
Filed April 1, 1926    7 Sheets-Sheet 3

Inventor:
Max Skolnik.
By Whiteley and Ruckman
Attorneys.

Sept. 6, 1927.
M. SKOLNIK
1,641,646
WOODWORKING APPARATUS
Filed April 1, 1926    7 Sheets-Sheet 4
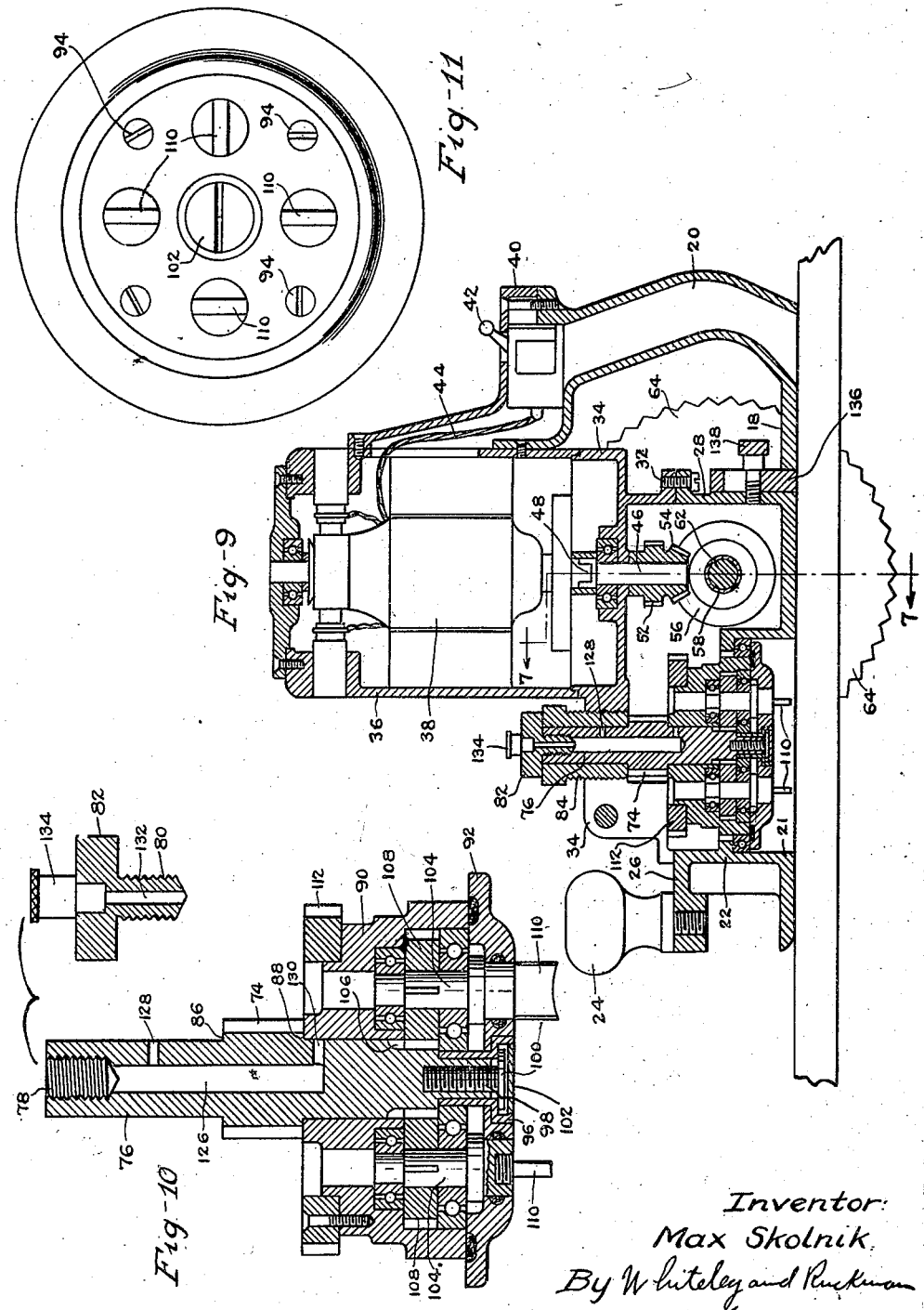
Inventor:
Max Skolnik.
By Whiteley and Ruckman
Attorneys.

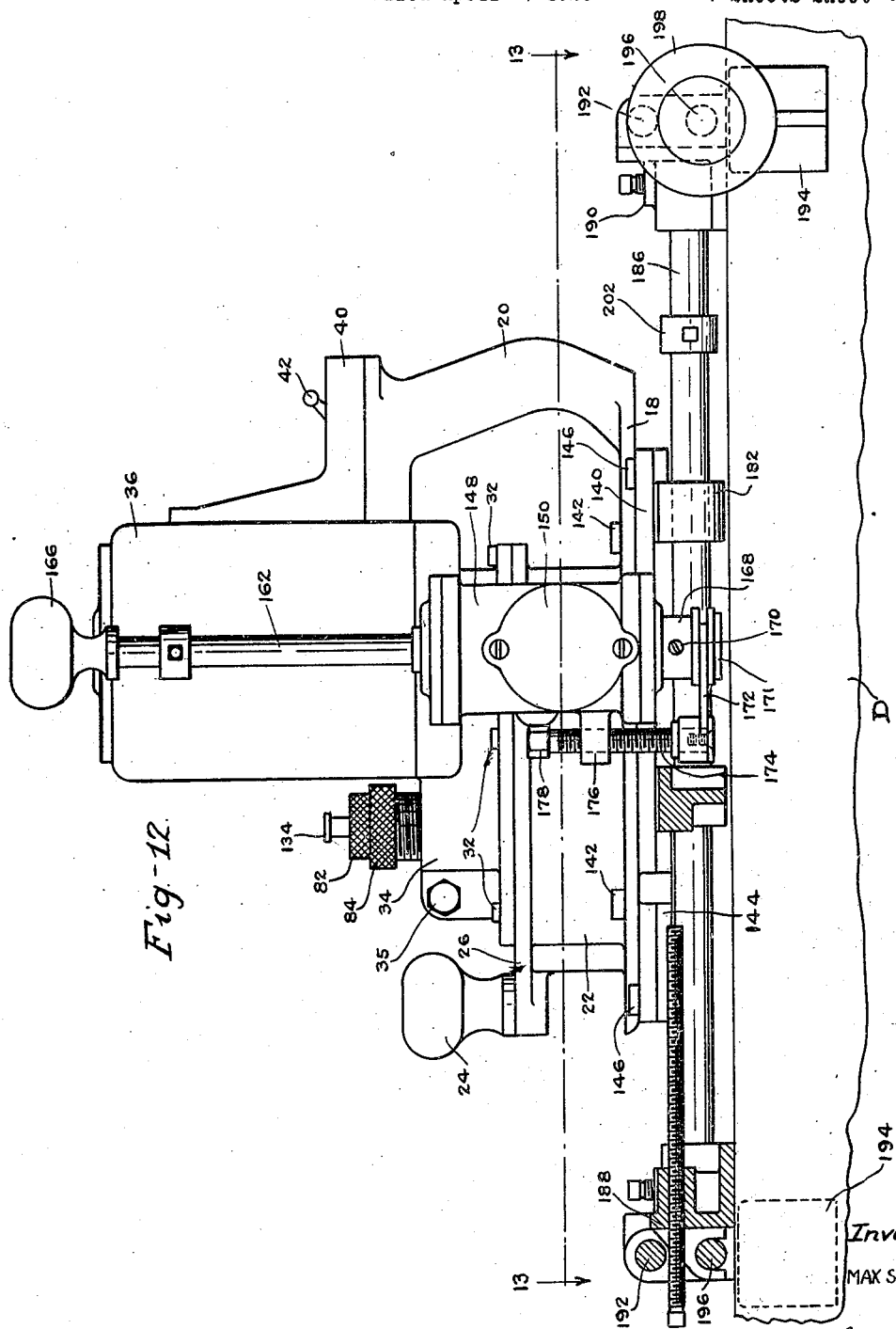

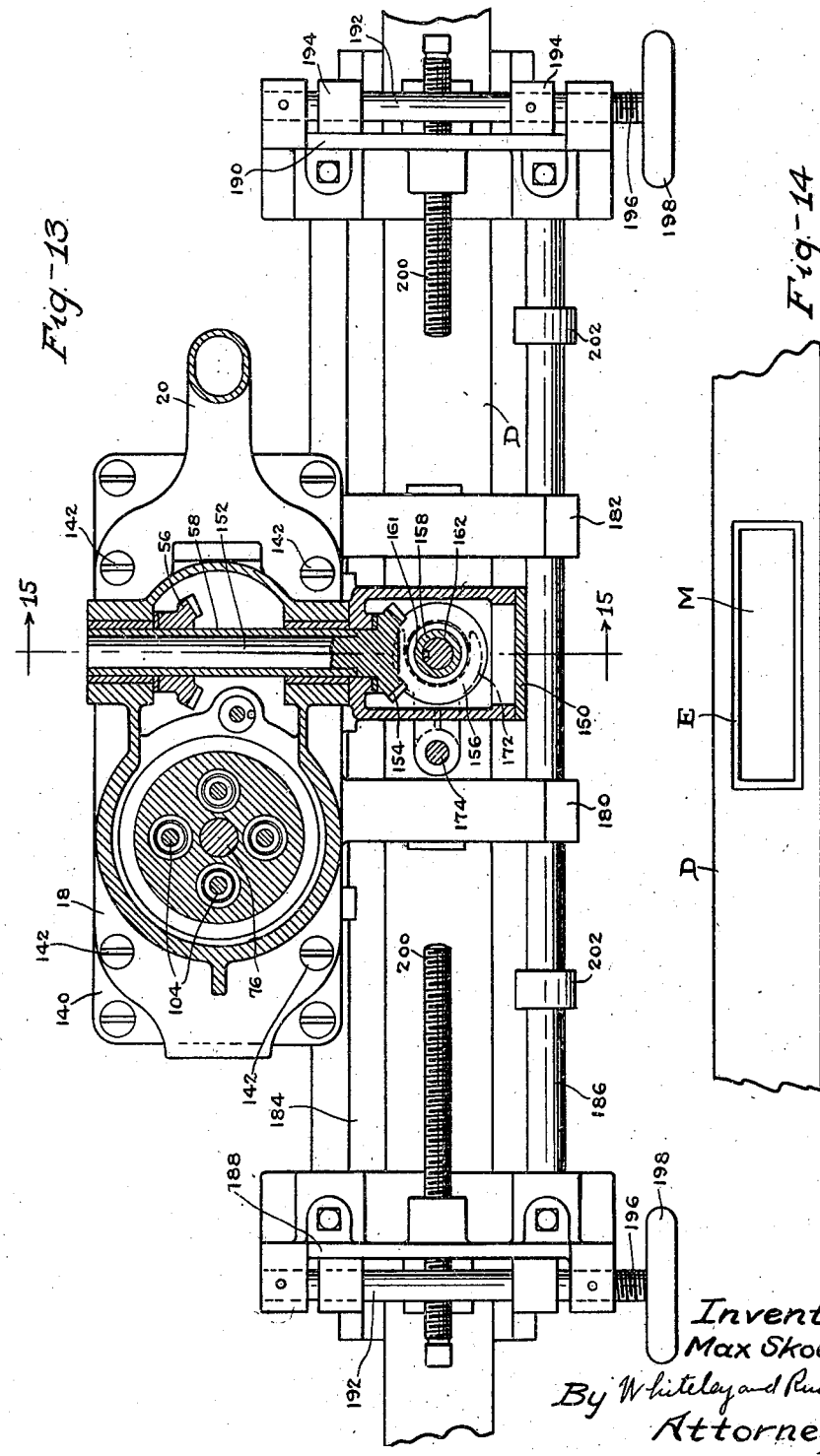

Inventor:
Max Skolnik
By Whiteley and Ruckman
Attorneys.

Patented Sept. 6, 1927.

1,641,646

UNITED STATES PATENT OFFICE.

MAX SKOLNIK, OF MINNEAPOLIS, MINNESOTA, ASSIGNOR TO THE SKOLNIK PATENTS, INCORPORATED, OF MINNEAPOLIS, MINNESOTA, A CORPORATION OF INDIANA.

WOODWORKING APPARATUS.

Application filed April 1, 1926. Serial No. 99,045.

My invention relates to wood working apparatus. While intended primarily for working on wood, the apparatus may be employed under certain conditions for working on other materials, and it will be understood that the term "wood working apparatus" will not exclude such use. One object of the invention is to provide power driven mechanism which may be manipulated manually, and which may be used for operating various tools ordinarily contained in tool chests and driven manually such as tools for planing, grooving, sawing, grinding, polishing, drilling, boring, driving screws and mortising. Another object is to provide a support carrying an electric motor which operates driving mechanism by means of which various tools of the character above enumerated may be driven. Another object is to provide an apparatus of this character having a plurality of cutters which are given a combined movement of rotation and revolution for planing wood. Another object is to provide an apparatus of the character just mentioned in which the mechanism for causing revolution of the cutters may be rendered inoperative so that the cutters will be given a simple movement of rotation on their axes in order that they may be used for grooving.

The full objects and advantages of my invention will appear in connection with the detailed description thereof, and the novel features of my inventive idea will be particularly pointed out in the claims.

In the accompanying drawings which illustrate a practical embodiment of my invention,—

Figure 4:
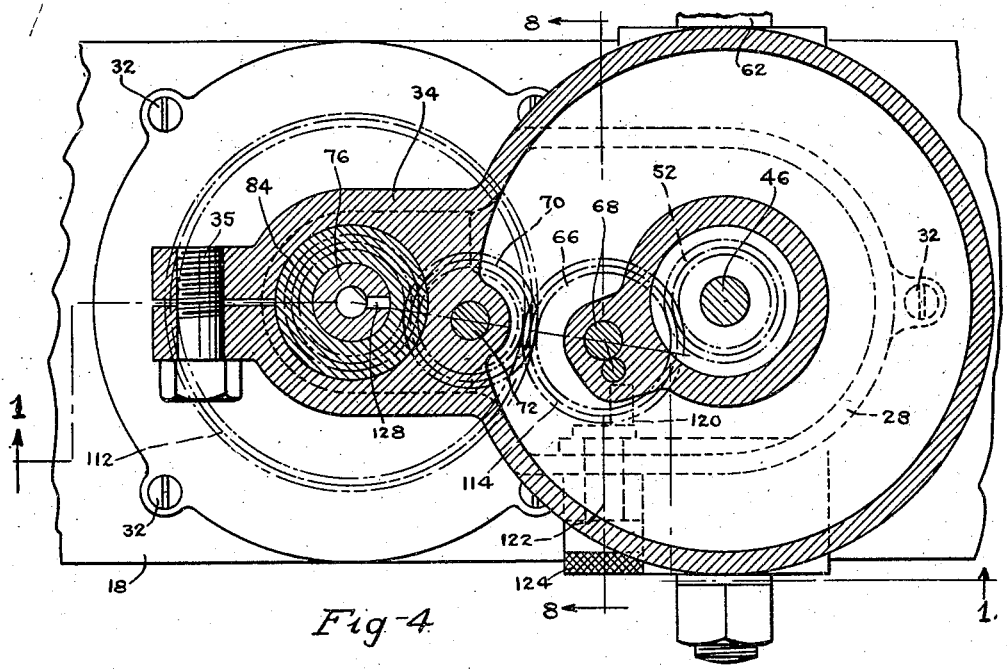
Figure 5:
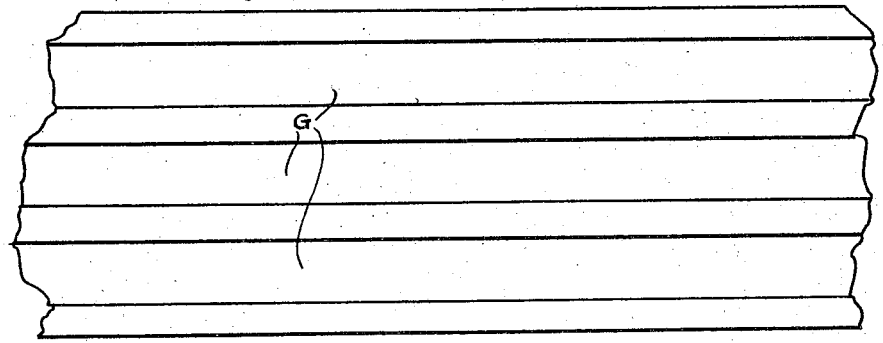
Figure 6:
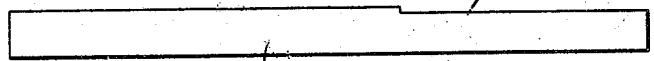
Figure 7:
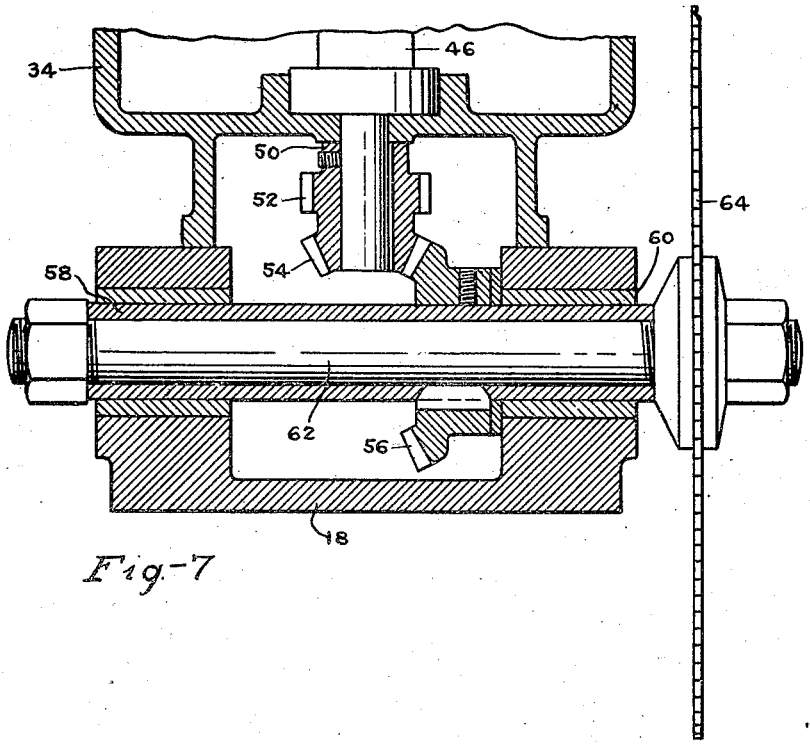
Figure 8:
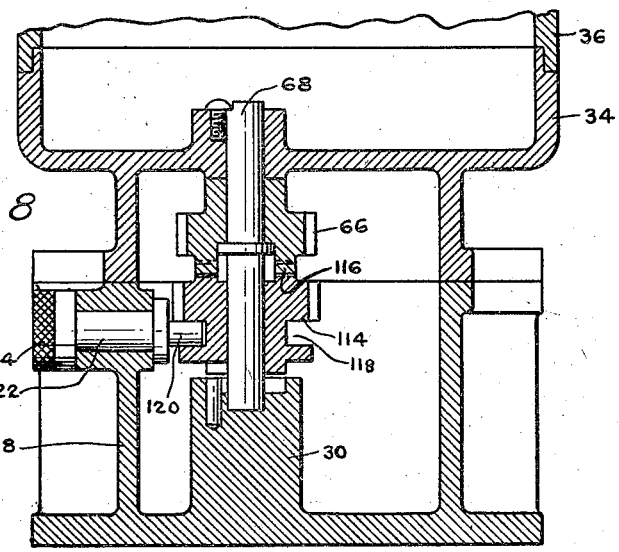
Figure 15:
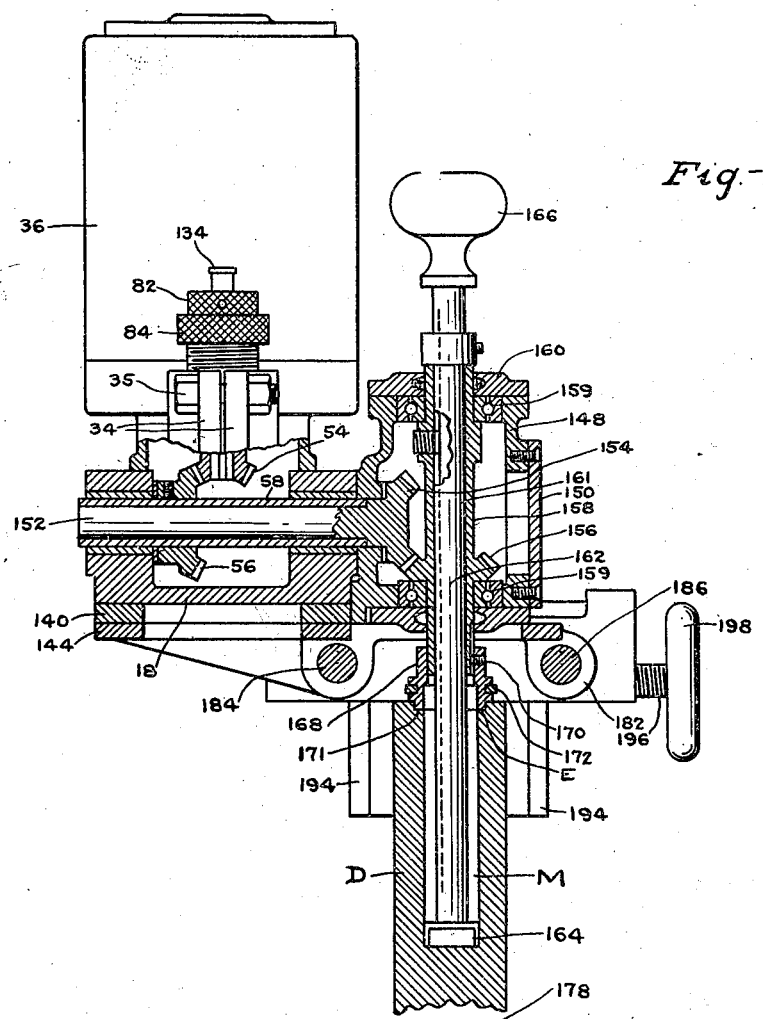
Figure 16:
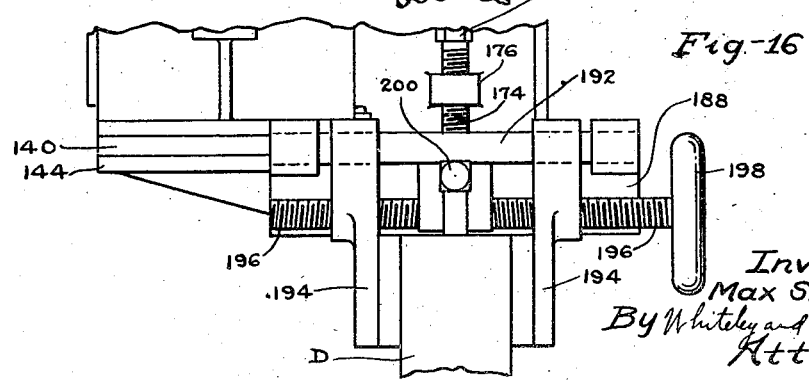

Fig. 1 is a view partly in side elevation and partly in vertical section on the line 1—1 of Fig. 4 showing the planing device in raised position. Fig. 2 is a similar view showing the device set for planing. Fig. 3 is a similar view showing the device set for grooving. Fig. 4 is a view in horizontal section on the line 4—4 of Fig. 2. Fig. 5 is a view showing a board with grooves cut in its upper surface. Fig. 6 is a view showing a board partly planed. Fig. 7 is a view in vertical section on the line 7—7 of Fig. 9 in which a saw is attached. Fig. 8 is a view in vertical section on the line 8—8 of Fig. 4. Fig. 9 is a view in central vertical section. Fig. 10 is a view on a larger scale of the planing mechanism removed from the support. Fig. 11 is a bottom plan view of the planing mechanism. Fig. 12 is a side elevational view with a small portion in section, this view showing a mortising attachment. Fig. 13 is a view in section on the line 13—13 of Fig. 12. Fig. 14 is a view showing a mortise cut in the edge of a door. Fig. 15 is a view in section on the line 15—15 of Fig. 13. Fig. 16 is a front elevational view of a clamp for the mortising attachment.

As shown in the drawings, the device includes a base plate 18 from the rear end of which a handle member 20 extends upwardly. The forward portion of the plate 18 has a circular opening 21 from around which a curved wall 22 extends upwardly. A handle member 24 is secured to a lug 26 extending forwardly from the upper portion of the wall 22. From the rear of the plate 18, a wall member 28 extends upwardly, and this wall member together with the wall 22 forms a lower casing across which extends a partition 30 formed as a continuation of the wall 22 but thicker and shorter than the front portion thereof, as will be obvious from Fig. 1. It will be apparent from Fig. 12 that screws 32 secure a casing 34 upon the lower casing. The casing 34 has the shape shown in Fig. 4 and at its forward end is split with the ends secured together by a screw bolt 35. Secured upon the casing 34 is a motor casing 36 containing an electric motor 38 of well known construction and hence not described in detail. An angular member 40 is secured at its upper end to the casing 36 and at its lower end is secured to the upper end of the handle member 20. The member 40 is hollow as shown in Fig. 9 and contains a switch 42 from which wires 44 connect with the motor for supplying current thereto when the switch is closed. The motor shaft 46 extends downwardly and is preferably made in two parts joined by a coupling 48 to facilitate separation of the parts. As best shown in Fig. 7, a hub 50 is secured to the lower end of the shaft 46. This hub carries a spur gear 52 and underneath the latter carries a bevel gear 54 in mesh with a bevel gear 56 whose hub is secured to a sleeve 58 mounted rotatably in bearings 60 formed integrally with the wall member 28. The shank or arbor of any tool which it is desired to rotate may be secured within the sleeve 58. As shown in Figs. 7 and 9, the arbor 62 of a saw 64 is secured in the sleeve 58. The spur gear 52 meshes with an idler gear 66 rotatably mounted on a vertical rod 68 whose lower end is supported by the wall member 30. The gear 66 meshes with another idler gear 70 rotatably mounted on a vertical rod 72 secured to a portion of the casing 34. The gear 70 meshes with a gear member 74 formed on a spindle 76 constructed as best shown in Fig. 10. This spindle at its upper end has a screw threaded recess 78 adapted to receive a screw threaded shank 80 formed on a head 82 adapted to rest upon the top of a sleeve 84 threaded into a screw-threaded opening in the casing 34. A shoulder 86 formed on the spindle 76 just above the gear member 74 engages the lower end of the sleeve 84 whereby the spindle is held for rotation in the sleeve. A shoulder 88 formed on the spindle 76 just below the gear member 74 engages the upper end of an annular member 90 through which the lower end of the spindle 76 extends. A cap 92 is secured to the lower end of the member 90 by screws 94 and this cap at its center has an opening which receives the enlarged lower end of a sleeve 96 in which the head 98 of a screw bolt 100 may rotate, this bolt being screwed into the lower end of the spindle 76, thereby retaining the annular member 90 on the spindle. The outer end of the opening in the sleeve 96 is preferably closed by a screw-threaded disk 102. A plurality of shafts 104 preferably four in number, are mounted in bearings carried by the annular member 90 in spaced relation around the spindle 76 which has a gear member 106 meshing with gears 108 keyed to the shafts 104. The lower ends of the latter shafts are provided with screw-threaded sockets which receive the screw-threaded ends of cutters 110 which may be caused to project below the base plate 18 to any desired extent by turning the sleeve 84. A gear 112 secured to the upper end of the member 90 meshes with a gear 114 loosely and slidably mounted on the rod 68. The upper end of the gear 114 has clutch teeth 116 adapted to engage between corresponding clutch teeth formed on the lower end of the gear 66. In order to slide the gear 114 up and down, it has a peripheral groove 118 which receives a pin 120 eccentrically carried by a rod 122 rotatably mounted in the wall 28 and having a knurled head 124 by means of which it may be rotated. In order to lubricate the rotating elements, the spindle 76 is provided with a longitudinal passageway 126 from which lateral perforations 128 and 130 extend, and the screw-threaded member 80 has a passageway 132 communicating with a recess in the head 82 closed by a plug 134. A plate 136 is adjustably secured to the rear of the wall 28 by means of a thumb screw 138 which passes through a slot in the plate, and screws into the wall 28 as clearly shown in Fig. 9. When the device is to be used for planing, the sleeve 84 is turned to bring the cutters 110 the proper distance below the base plate 18 while the adjustable plate 136 is set to project the same distance. The rod 122 is turned to slide the gear 114 into clutching engagement with the gear 66. Then upon starting the motor, the cutters 110 will not only rotate on their axes but will be given a movement of revolution around the spindle 76, since the member 90 will be rotated by engagement of the gear 114 with the gear 112. The device by these operations will be set in the position shown in Fig. 2, and when started at the end of a board B shown in Fig. 6, the top surface of the board will be cut away as indicated at C and the plate 136 will move in engagement with the plane surface and aid in supporting the device as it is moved along the board. On account of the combined rotation and revolution of the cutters, the board will be very smoothly dressed without any splintering action. When it is desired to use the device for grooving, the gear 114 is disengaged from the gear 66 so that the cutters will rotate on their axes without revolving around the spindle 76. Cutters of a size to make the desired width of groove may be readily substituted if the ones in use are not of the proper size and the member 90 may be partially turned and set in position to locate the grooves in the desired places in the board. Fig. 5 shows three grooves G made at one time. If only one or two grooves are desired, this result may be accomplished by removal of some of the cutters. When the device is to be used for sawing, the planing mechanism may be removed upon unscrewing the head 82 as will be understood from Figs. 9 and 10. The opening 21 in the base plate may be supplied with a cover if desired, in order to keep out sawdust. The saw arbor 62 is then secured to the sleeve 58 as shown in Fig. 7. It will be obvious that when the saw arbor is removed from the sleeve, other tools may be secured for rotation with the sleeve such as grinding and polishing devices, screw drivers, augers, and gimlets.

In order to use the device for mortising, a skeleton plate 140 is secured to the underside of the base plate 18 by screw 142 and a skeleton plate 144 is secured to the underside of the plate 140 by screw 146. The plate 140 carries an upwardly extending hollow member 148 having an opening in its side closed by a disk 150 while in the opposite side of this hollow member there is a bearing which receives a shaft 152 adapted to be slid into the sleeve 58, previously referred to, and secured so as to rotate therewith. The end of the shaft 152 carries a bevel gear 154 which meshes with a bevel gear 156 secured to a sleeve 158 rotatably mounted in bearings 159 contained in the member 148. The sleeve 158 carries a screw 160 which engages a longitudinal groove 161 in the shank 162 of a boring tool 164. The shank 162 at its upper end is provided a handle 166 by means of which the shank may be slid in the sleeve 158 while rotating therewith. A short sleeve 168 is held slidably on the lower end of the sleeve 158 for rotation therewith by a screw 170 carried by the sleeve 168 and engaging a groove in the sleeve 158. The sleeve 168 has a lower cutting edge 171 and a peripheral groove into which fits fork 172 carried at the lower end of a screw-threaded rod 174 engaging in a screw-threaded opening in a lug 176 extending out from the member 148. The rod 174 has an angular head 178 by means of which it can be turned. The lower plate 144 has perforated arms 180 and 182 projecting therefrom through the perforations of which parallel rods 184 and 186 extend so that the portion of the device previously described may be slid on the rods. The ends of these rods are secured in heads 188 and 190 having lugs which support rods 192. Pairs of clamps 194 have perforations near their upper ends through which the rods 192 extend. Rods 196 having right and left screw-threaded portions as shown in Fig. 16 extend through screw-threaded openings in the clamps. These rods have hand wheels 198 secured on their ends upon turning of which in the proper direction the clamps may be brought into clamping engagement with the opposite sides of an article such as a door D. The heads 188 and 190 are provided with longitudinally extending screws 200 which constitute adjustable stops for limiting the sliding movement of the tool-carrying device. Collars 202 may, if desired, be secured adjustably on the rod 186 for this purpose. In order to use the apparatus for mortising, it is attached to the article to be operated upon by means of the clamps 194 as will be understood from Figs. 15 and 16. When the motor is started, the cutter 164 will be rotated and the portion of the device carried upon the rods 184 and 186 is moved back and forth manually between the adjustable stops, this operation being continued until the mortise M is cut to the desired depth, it being understood that the cutter is gradually depressed by means of the handle mounted on the shank of the cutter. In order to enlarge the outer margin of the mortise to provide for receiving the outer edge plate of a door lock, the screw 174 is turned to depress the sleeve 168 so that its cutting edge will form the enlargement E.

I claim:

1. Woodworking apparatus comprising a support, an electric motor mounted on said support, a shaft driven by said motor, two gears secured to said shaft, a carrying member removably mounted in said support, a plurality of vertical tool carrying shafts mounted in said carrying member, driving connections between said shafts and one of said gears, a horizontal sleeve rotatably mounted in said support and to which a tool carrying shaft is adapted to be secured, and a gear secured to said sleeve in mesh with the other of said first mentioned gears.

2. Woodworking apparatus comprising a support, an electric motor mounted on said support, a gear secured to said shaft, a rod, an idler gear mounted on said rod and meshing with said first gear, a gear slidably mounted on said rod for clutched and unclutched engagement with said idler gear, a spindle rotatably mounted in said support, driving connections between said spindle and said idler gear, an annular member rotatably mounted on said spindle, a plurality of tool carrying shafts rotatably mounted in said annular member, gears secured to said shafts, a second gear secured to said spindle and meshing with said last mentioned gears, and a gear secured around said annular member and meshing with said slidable gear.

3. Wood working apparatus comprising a support, an electric motor mounted on said support, a shaft driven by said motor, two gears secured to said shaft, a plurality of vertical tool-carrying shafts removably mounted in said support, driving connections between said shafts and one of said gears, a horizontal tool-carrying shaft removably mounted in said support, and driving connections between said shaft and the other of said gears.

4. Wood working apparatus comprising a support, an electric motor mounted on said support, a shaft driven by said motor, a gear secured to said shaft, a rod, an idler gear mounted on said rod and meshing with said first gear, a gear slidably mounted on said rod for clutched and unclutched engagement with said idler gear, a second rod, an idler gear mounted on said rod and meshing with said first idler gear, a spindle rotatably mounted in said support, a gear secured to said spindle and meshing with said second idler gear, an annular member rotatably mounted on said spindle, a plurality of tool-carrying shafts rotatably mounted in said annular member, gears secured to said shafts, a second gear secured to said spindle and meshing with said last mentioned gears, and a gear secured around said annular member and meshing with said slidable gear.

In testimony whereof I hereunto affix my signature.

MAX SKOLNIK.